US012793222B2

(12) United States Patent
Erkamp et al.

(10) Patent No.: US 12,793,222 B2
(45) Date of Patent: Nov. 10, 2026

(54) X-RAY PROJECTION IMAGE SCORING

(71) Applicant: KONINKLIJKE PHILIPS N.V., Eindhoven (NL)

(72) Inventors: Ramon Quido Erkamp, Swampscott, MA (US); Ayushi Sinha, Baltimore, MD (US); Grzegorz Andrzej Toporek, Cambridge, MA (US); Leili Salehi, Waltham, MA (US); Ashish Sattyavrat Panse, Burlington, MA (US)

(73) Assignee: Koninklijke Philips N.V., Eindhoven (NL)

( * ) Notice: Subject to any disclaimer, the term of this patent is extended or adjusted under 35 U.S.C. 154(b) by 228 days.

(21) Appl. No.: 18/704,626

(22) PCT Filed: Oct. 21, 2022

(86) PCT No.: PCT/EP2022/079371
§ 371 (c)(1),
(2) Date: Apr. 25, 2024

(87) PCT Pub. No.: WO2023/072752
PCT Pub. Date: May 4, 2023

(65) Prior Publication Data

US 2024/0412368 A1 Dec. 12, 2024

Related U.S. Application Data

(60) Provisional application No. 63/272,318, filed on Oct. 27, 2021.

(51) Int. Cl.
*G06T 7/00* (2017.01)

(52) U.S. Cl.
CPC .. *G06T 7/0014* (2013.01); *G06T 2207/10121* (2013.01); *G06T 2207/20081* (2013.01);
(Continued)

(58) Field of Classification Search
CPC . G06T 2207/10116; G06T 2207/10121; G06T 2207/20081; G06T 2207/20084;
(Continued)

(56) References Cited

U.S. PATENT DOCUMENTS

| | | | |
|---|---|---|---|
| 9,713,451 | B2 | 7/2017 | Auvray et al. |
| 10,354,171 | B2 | 7/2019 | Hsieh et al. |

(Continued)

FOREIGN PATENT DOCUMENTS

| | | |
|---|---|---|
| WO | 2021046579 A1 | 3/2021 |

OTHER PUBLICATIONS

Fang et al., "Generalized Radiographic View Identification with Deep Learning", Journal of Digital Imaging, (2021) 34, pp. 66-74.

(Continued)

*Primary Examiner* — Zhiyu Lu

(57) ABSTRACT

A computer-implemented method of determining image perspective score values ($s_1$) for X-ray projection images (110) representing a region of interest (120) in a subject, is provided. The method includes: receiving (SI 10) a plurality of X-ray projection C images (110), the X-ray projection images representing the region of interest (120) from a plurality of different perspectives of an X-ray imaging system (130) respective the region of interest; inputting (S120) the X-ray projection images into a neural network (NN1); and in response to the inputting, generating (S130) a predicted image perspective score value ($s_1$) for each of the X-ray projection images.

14 Claims, 8 Drawing Sheets

(52) U.S. Cl.
CPC ............... *G06T 2207/20084* (2013.01); *G06T 2207/30004* (2013.01); *G06T 2207/30168* (2013.01)

(58) Field of Classification Search
CPC . G06T 2207/30004; G06T 2207/30168; G06T 7/0012; G06T 7/0014
See application file for complete search history.

(56) References Cited

U.S. PATENT DOCUMENTS

| | | | |
|---|---|---|---|
| 10,667,776 | B2 | 6/2020 | Rofféet al. |
| 2024/0047043 | A1 | 2/2024 | Flexman et al. |

OTHER PUBLICATIONS

Ahn et al., "Multi-view convolutional neural networks in rupture risk assessment of small, unruptured intracranial aneurysms", Journal of Personal Medincine (2021), 11, 239, pp. 1-11.
Wilson et al., "Determining X-ray projections for coil treatments of intracranial aneurysms" IEEE Transactions on Medical Imaging, vol. 18, No. 10, Oct. 1999, pp. 973-980.
Sharma et al., "Determination of Optimal c-arm angulation for assessment of angiography-based fractional flow reserve", Prior art publishing, Siemens AG, (2018),.
Ramalho et al., "Density estimation in representation space to predict model uncertainty" https://arxiv.org/pdf/1908.07235, (2019).
Berechung optimaler C-Arm Angulation fuer eine AAA Stenting Prozedur ED—Darl Kuhn, ip.com, ip.com Inc., West Henrietta, NY US, Dec. 22, 2009.
International Search report and Written Opinion of PCT/EP2022/079371, dated Feb. 14, 2023.

X-RAY PROJECTION IMAGE SCORING

CROSS-REFERENCE TO PRIOR APPLICATIONS

This application is the U.S. National Phase application under 35 U.S.C. § 371 of International Application No. PCT/EP2022/079371, filed on Oct. 21, 2022, which claims the benefit of U.S. Provisional Application No. 63/272,318, filed on Oct. 27, 2021. These applications are hereby incorporated by reference herein.

TECHNICAL FIELD

The present disclosure relates to determining image perspective score values for X-ray projection images. A computer-implemented method, a system, and a computer program product, are disclosed.

BACKGROUND

Medical investigations frequently use X-ray projection images to provide information on a region of interest. As compared to 3D X-ray images, projection images, i.e. 2D images, may be generated with lower X-ray dose. However, projection images represent the integrated X-ray attenuation along X-ray paths, and it can be challenging to find a perspective of the X-ray imaging system respective the region of interest, i.e. a viewing angle, that provides the desired information in the projection images.

By way of an example, aneurism coiling procedures typically involve the insertion of wire coils into a sack of the aneurism in order to reduce blood flow and thereby enable the blood inside the aneurysm to coagulate. A goal in aneurism coiling is to fill the aneurysm sac with sufficient coils in order to effectively treat the aneurysm, whilst avoiding overfilling. Overfilling the aneurism can result in the aneurysm rupturing, or coil material spilling into the parent vessel that is connected to the aneurysm sac. Aneurism coiling procedures are typically performed using X-ray projection images. In order to detect coil material spilling into the parent vessel, a radiographer typically tries to find a perspective of the X-ray imaging system that minimizes the overlap between the sac and the parent vessel in the projection image. The radiographer may also try to find a perspective of the X-ray imaging system that provides minimal overlap between the parent vessel and other anatomical structures, and which also provides minimal foreshortening of the parent vessel.

The need for finding an optimal perspective of an X-ray imaging system for generating projection images also exists beyond vascular procedures. By way of another example, spinal fusion procedures that are performed to restore stability in severe arthritis or after removal of a herniated disk, often involve the placement of pedicle screws into vertebrae. In order to confirm the successful placement of the screws, a perspective of the X-ray imaging system is desired that not only minimizes foreshortening of the screw, but also minimizes overlap between the screw and the spinal cord in order to ensure that no injury to the spinal cord may occur. Yet another example may be found in the field of orthopaedics, and wherein a perspective of an X-ray imaging system may be desired that minimizes foreshortening of target bony structures whilst also minimizing their overlap with other anatomical structures. Thus, it may be useful to assess the perspective of X-ray projection images in order to provide an optimal perspective for an X-ray imaging system.

Owing to the multitude of factors that affect the choice of a perspective of an X-ray imaging system for generating X-ray projection images, a trial-and-error approach is often used, and wherein an initial promising perspective of the X-ray imaging system is adjusted until an image with an acceptable perspective is obtained. This, however, increases the amount of X-ray dose to a subject, and may ultimately provide an image with a perspective that is only marginally improved.

An improvement to the trial-and-error approach for finding an optimal perspective of an X-ray imaging system is the analytical approach described in a document by D. L. Wilson, et al., entitled "Determining X-ray projections for coil treatments of intracranial aneurysms" in IEEE Transactions on Medical Imaging, vol. 18, no. 10, pp. 973-980, October 1999, doi: 10.1109/42.811309. In this document, a method is presented for automatically finding the angles that will produce desired X-ray projections.

Aside from finding an optimal perspective for an X-ray imaging system, it may be useful to assess the perspective of X-ray projection images in other situations as well. By way of an example, medical investigations often involve the acquisition of multiple X-ray projection images of a region of interest. After the medical investigation, many of the acquired images serve little purpose since the information they provide is duplicated in other images. In order to limit data storage requirements, it would be beneficial to archive only the image(s) having a perspective that meet predetermined criteria. However, manually analyzing such images is time-consuming.

Consequently, there remains room for improvements in assessing the perspective of X-ray projection images.

SUMMARY

According to one aspect of the present disclosure, a computer-implemented method of determining image perspective score values for X-ray projection images representing a region of interest in a subject, is provided. The method includes:

- receiving a plurality of X-ray projection images, the X-ray projection images representing the region of interest from a plurality of different perspectives of an X-ray imaging system respective the region of interest;
- inputting the X-ray projection images into a neural network; and
- in response to the inputting, generating a predicted image perspective score value for each of the X-ray projection images; and
- wherein the neural network is trained to generate the predicted image perspective score values for the X-ray projection images.

The predicted image perspective score values provide an indication of the quality of the perspectives of the X-ray images. The predicted image perspective score values may be used for various purposes. For example, they may be used to determine which of the inputted X-ray projection images provide an acceptable perspective, and thus which perspective of the X-ray imaging system to use to acquire further X-ray images. The predicted image perspective score values may also be used to determine which of the inputted X-ray images to archive.

Further aspects, features, and advantages of the present disclosure will become apparent from the following description of examples, which is made with reference to the accompanying drawings.

DETAILED DESCRIPTION

Figure 1:
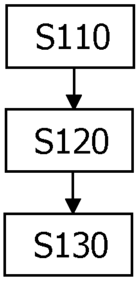
FIG. 1 is a flowchart illustrating an example of a method of determining image perspective score values for X-ray projection images, in accordance with some aspects of the present disclosure.

Examples of the present disclosure are provided with reference to the following description and figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a computer implemented method, may be implemented in a computer program product, and in a system, in a corresponding manner.

In the following description, reference is made to examples of computer-implemented methods that involve determining image perspective score values for X-ray images representing a region of interest in a subject. Reference is made to examples of X-ray projection images in the form of angiographic images wherein the region of interest is an aneurism in the brain. The angiographic images may be generated using angiographic techniques such as digital subtraction angiography "DSA", for example. Angiographic images, i.e. images that are generated using a contrast agent, are typically used to visualize regions of interest in the vasculature, such as aneurisms. However, it is to be appreciated that these angiographic images serve only as examples, and that the computer-implemented methods disclosed herein may also be used with other types of X-ray projection images, such as for example fluoroscopic images, and also images which represent other regions of interest other than the vasculature. It is therefore to be appreciated that the computer-implemented methods may be used to determine image perspective score values for X-ray projection images in general, and that the use of the methods is not limited to X-ray images that include aneurisms, or to images of the brain.

It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be implemented in a computer program product. The computer program product can be provided by dedicated hardware, or hardware capable of running the software in association with appropriate software. When provided by a processor, the functions of the method features can be provided by a single dedicated processor, or by a single shared processor, or by a plurality of individual processors, some of which can be shared. The functions of one or more of the method features may for instance be provided by processors that are shared within a networked processing architecture such as a client/server architecture, a peer-to-peer architecture, the Internet, or the Cloud.

The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W", Blu-Ray™ and DVD.

As mentioned above, it may be useful to assess the perspective of X-ray projection images in various situations.

One example of such a situation relates to an aneurism coiling procedure. A goal in aneurism coiling is to fill the aneurysm sac with sufficient coils in order to effectively treat the aneurysm, whilst avoiding overfilling. In order to detect coil material spilling into the parent vessel, a radiographer typically tries to find a perspective of the X-ray imaging system that minimizes the overlap between the sac and the parent vessel in the projection image. The radiographer may also try to find a perspective of the X-ray imaging system that provides minimal overlap between the parent vessel and other anatomical structures, and which also provides minimal foreshortening of the parent vessel. Overlap between the parent vessel and other anatomical structures is desirably minimized in order to provide a clear view of the parent vessel. Foreshortening is desirably minimized because a significant portion of coiling wire in the vessel could be overlooked if the longitudinal axis of the wire is aligned with the viewing angle.

Another situation in which it is useful to assess the perspective of X-ray projection images, relates to image archiving. Medical investigations often involve the acquisition of multiple X-ray projection images of a region of interest. After the medical investigation, many of the acquired images serve little purpose since the information they provide is duplicated in other images. In order to limit data storage requirements, it would be beneficial to archive only the images that provide a desired perspective of the region of interest. However, the manual analysis of such images is time-consuming.

It may also be useful to assess the perspective of X-ray projection images in other situations as well.

Figure 2:
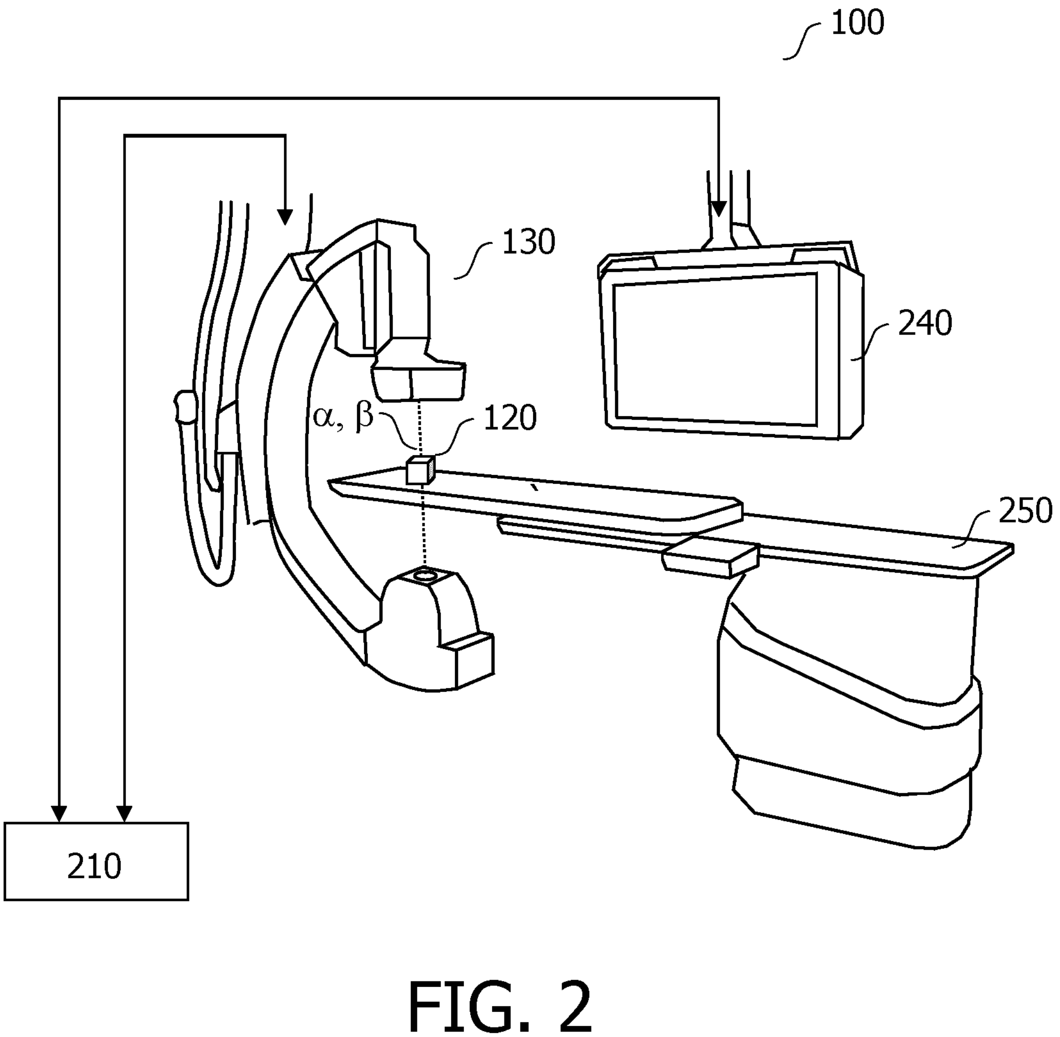
FIG. 2 is a schematic diagram illustrating an example of a system 100 for determining image perspective score values for X-ray projection images, in accordance with some aspects of the present disclosure.

FIG. 1 is a flowchart illustrating an example of a method of determining image perspective score values for X-ray projection images, in accordance with some aspects of the present disclosure. FIG. 2 is a schematic diagram illustrating an example of a system 100 for determining image perspective score values for X-ray projection images, in accordance with some aspects of the present disclosure. Operations described in relation to the method illustrated in FIG. 1, may also be performed by the system 100 illustrated in FIG. 2. Likewise, operations described in relation to the system 100 may also be performed in the method described with reference to FIG. 1.

With reference to FIG. 1, a computer-implemented method of determining image perspective score values $s_1$ for X-ray projection images 110 representing a region of interest 120 in a subject, is provided. The method includes:

receiving S110 a plurality of X-ray projection images 110, the X-ray projection images representing the region of interest 120 from a plurality of different perspectives of an X-ray imaging system 130 respective the region of interest;

inputting S120 the X-ray projection images into a neural network NN1; and in response to the inputting, generating S130 a predicted image perspective score value $s_1$ for each of the X-ray projection images; and wherein the neural network NN1 is trained to generate the predicted image perspective score values $s_1$ for the X-ray projection images.

The above method is also described with reference to FIG. 3, which is a schematic diagram illustrating an example of a method of determining image perspective score values $s_1$ for X-ray images using a neural network NN1, in accordance with some aspects of the present disclosure.

Figure 3:
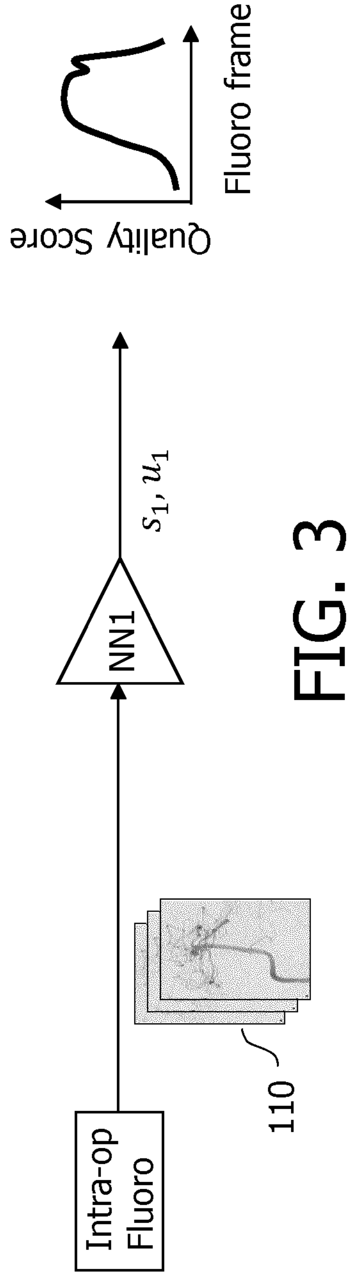
FIG. 3 is a schematic diagram illustrating an example of a method of determining image perspective score values $s_1$ for X-ray projection images using a neural network NN1, in accordance with some aspects of the present disclosure.

With reference to FIG. 1 and FIG. 3, in the operation S110, a plurality of X-ray projection images 110 are received. The X-ray projection images 110 may be generated by an X-ray imaging system. The X-ray projection images 110 may be generated by a projection X-ray imaging system that generates 2D X-ray images. Projection X-ray imaging systems typically include a support arm such as a so-called "C-arm", or an "O-arm", that supports an X-ray source-detector arrangement. Projection X-ray imaging systems may alternatively include a support arm with a different shape to these examples. Projection X-ray imaging systems typically generate projection X-ray images with the support arm held in a static position with respect to an imaging region during the acquisition of image data. The X-ray projection images may for example be generated by the projection X-ray imaging system 130 illustrated in FIG. 2. By way of an example, the angiographic images may be generated by the Philips Azurion 7 X-ray imaging system marketed by Philips Healthcare, Best, The Netherlands.

The X-ray projection images 110 that are received in the operation S110 may be angiographic images, or they may be fluoroscopic, i.e. live images, for example. Angiographic projection images may be generated using a digital subtraction angiographic "DSA" technique, and wherein each image is generated by subtracting from the image the corresponding pixel intensities of a background image. The X-ray projection images 110 that are received in the operation S110 may alternatively be synthetic projection images that are generated by projecting, at different perspectives, a 3D X-ray image, such as a 3D angiogram, that is generated by a volumetric X-ray imaging system. In contrast to projection X-ray imaging systems, volumetric X-ray imaging systems typically generate image data whilst rotating, or stepping, an X-ray source-detector arrangement around an imaging region, and subsequently reconstruct the image data obtained from multiple rotational angles into a 3D, or volumetric image. Examples of volumetric X-ray imaging systems include computed tomography "CT" imaging systems, cone beam CT "CBCT" imaging systems, and spectral CT imaging systems. A 3D angiogram may be generated from a volumetric imaging system by performing an imaging operation using a contrast agent. The synthetic projection images may be generated from the 3D X-ray image by projecting the 3D X-ray image onto a virtual detector based on the perspective of an X-ray source-detector arrangement respective the 3D X-ray image.

The X-ray projection images that are received in the operation S110 may be received from an X-ray imaging system, such as the projection X-ray imaging system 130 illustrated in FIG. 2, or from a computer readable storage medium, or from the Internet or the Cloud, for example. The X-ray projection images may be received by the one or more processors 210 illustrated in FIG. 2. The X-ray projection images may be received via any form of data communication, including wired, optical, and wireless communication. By way of some examples, when wired or optical communication is used, the communication may take place via signals transmitted on an electrical or optical cable, and when wireless communication is used, the communication may for example be via RF or optical signals.

The X-ray projection images that are received in the operation S110 represent a region of interest 120 from a plurality of different perspectives, i.e. orientations, of the X-ray imaging system respective the region of interest. In this respect, the X-ray projection images may be generated by adjusting a perspective, or orientation, of the projection X-ray imaging system 130 illustrated in FIG. 2 to different perspectives, or orientations, and generating an X-ray projection image at each perspective, or orientation. The adjusting may be performed by stepping a perspective of the X-ray imaging system around a cranial-caudal axis of the subject and/or around a longitudinal axis of a subject, for example.

In the operation S120, the X-ray projection images are inputted into a neural network NN1. The neural network NN1 is trained to generate predicted image perspective score values $s_1$ for the X-ray projection images. The predicted image perspective score values $s_1$ provide a subjective assessment of the quality of the perspectives of the X-ray projection images. The subjective assessment depends on the ground truth training data that is used to train the neural network NN1. A high quality perspective might for example be associated with an X-ray projection image in which the region of interest is separated from other features in the image. A high quality perspective might also be associated with an X-ray projection image in which a portion of the region of interest has a low amount of foreshortening. A high quality perspective might also be associated with an X-ray projection image in which there are few artifacts from confounding features. The degree to which such factors affect the predicted image perspective score values $s_1$ depends on the ground truth training data that is used to train the neural network NN1, and thus the predicted image perspective score values $s_1$ provide a subjective assessment of the quality of the perspectives of the X-ray projection images. Further detail on training the neural network NN1 is provided below.

Figure 12:
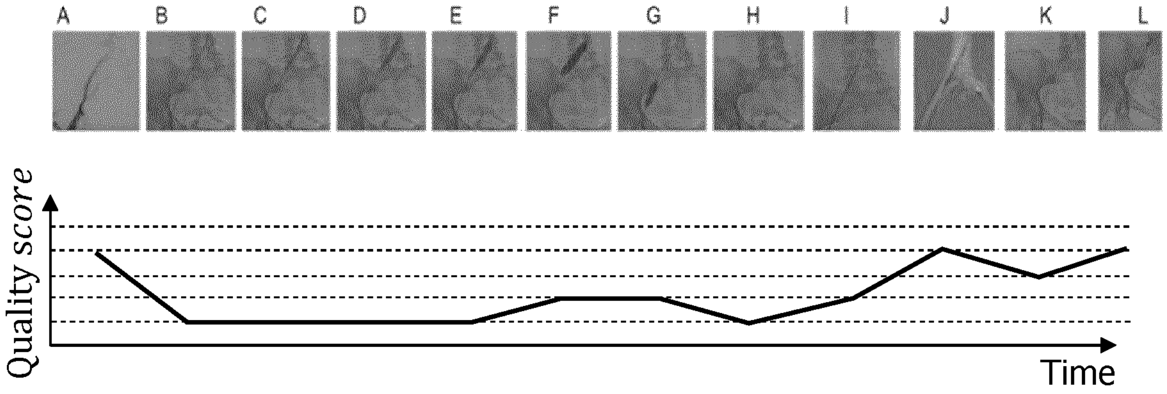
FIG. 12 is a schematic diagram illustrating an example of outputted image perspective score values, in accordance with some aspects of the present disclosure.

In the operation S130, in response to inputting the X-ray projection images into the neural network NN1, a predicted image perspective score value $s_1$ is generated for each of the X-ray projection images. The predicted image perspective score value $s_1$ may be outputted in various forms. In one example, the image perspective score value $s_1$ is outputted graphically for each of the X-ray projection images. An example of such a graphical output is the graph is illustrated in the right-hand portion of FIG. 3. Another example of outputted image perspective score values is illustrated in FIG. 12, which is a schematic diagram illustrating an example of outputted image perspective score values, in accordance with some aspects of the present disclosure. In the example illustrated in FIG. 12, the image perspective scores are outputted together with the corresponding X-ray projection images. A user may readily see from the graphs illustrated in FIG. 3 and FIG. 12, which of the images have the highest image perspective score values. The predicted image perspective score value $s_1$ may alternatively be outputted in other forms, such as by providing a numerical or graphical indication in each image, for example.

The predicted image perspective score values $s_1$ thus provide a subjective assessment of the quality of the perspectives of the X-ray projection images. The predicted image perspective score values $s_1$ may be used for various purposes. For example, they may be used to determine which of the inputted images have an acceptable perspective, and thus which perspective of the X-ray imaging system to use to generate further X-ray projection images. The predicted image perspective score values $s_1$ may also be used to select which of the inputted X-ray projection images to archive. In one example, the method described with reference to FIG. 1 includes identifying the X-ray projection image having the highest predicted image perspective score value and/or the corresponding perspective of the X-ray imaging system respective the region of interest.

The neural network NN1 may also generate a confidence value, $u_1$, for each of the predicted image perspective score values $s_1$. In one example, the method described above with reference to FIG. 1 may also include outputting the confidence values, $u_1$. The confidence values may be outputted in a similar manner to the image perspective score values $s_1$. The confidence values represent a confidence of the predictions made by the neural network NN1, and permit decisions to be made based on the perspective score values $s_1$. For example, if the confidence is low, it might be decided not to rely upon the predicted image perspective score values $s_1$. In one example, the confidence values of the predicted image perspective score values $s_1$ may be used to weight the predicted image perspective score values $s_1$.

An example of a technique for generating confidence values associated with a neural network's predictions is disclosed in a document by Ramalho, T. et al., entitled "Density estimation in representation space to predict model uncertainty", https://arxiv.org/pdf/1908.07235.pdf. The neural network NN1 may be trained in accordance with this technique to generate confidence values such that when the neural network NN1 is presented with an image that is very different from its training dataset, the neural network NN1 it is able to recognize this and the neural network NN1 outputs a low confidence value. The technique described in this document generates confidence values by estimating the training data density in representation space, and determining whether the trained network is expected to make a correct prediction for the input by measuring the distance in representation space between the input and its closest neighbors in the training set. Alternative techniques may also be used to generate confidence values associated with the predictions of the neural network NN1. The dropout technique may be used, for example. The dropout technique involves iteratively inputting the same data into a neural network and determining the neural network's output whilst randomly excluding a proportion of the neurons from the neural network in each iteration. The outputs of the neural network are then analyzed to provide mean and variance values. The mean value represents the final output, and the magnitude of the variance indicates whether the neural network is consistent in its predictions, in which case the variance is small, or whether the neural network was inconsistent in its predictions, in which case the variance is larger.

In one example, an analytical image perspective score value $s_2$ is also generated for each of the received X-ray projection images. The analytical image perspective score value $s_2$ provides an objective assessment of the quality of the perspective of each X-ray projection image. In this example, the analytical image perspective score value $s_2$ is combined with the predicted image perspective score value $s_1$ to provide a combined image perspective score value for each X-ray projection image. This example is described with reference to FIG. 4, which is a schematic diagram illustrating an example of a method of determining combined image perspective score values s' for X-ray projection images, in accordance with some aspects of the present disclosure.

Figure 4:
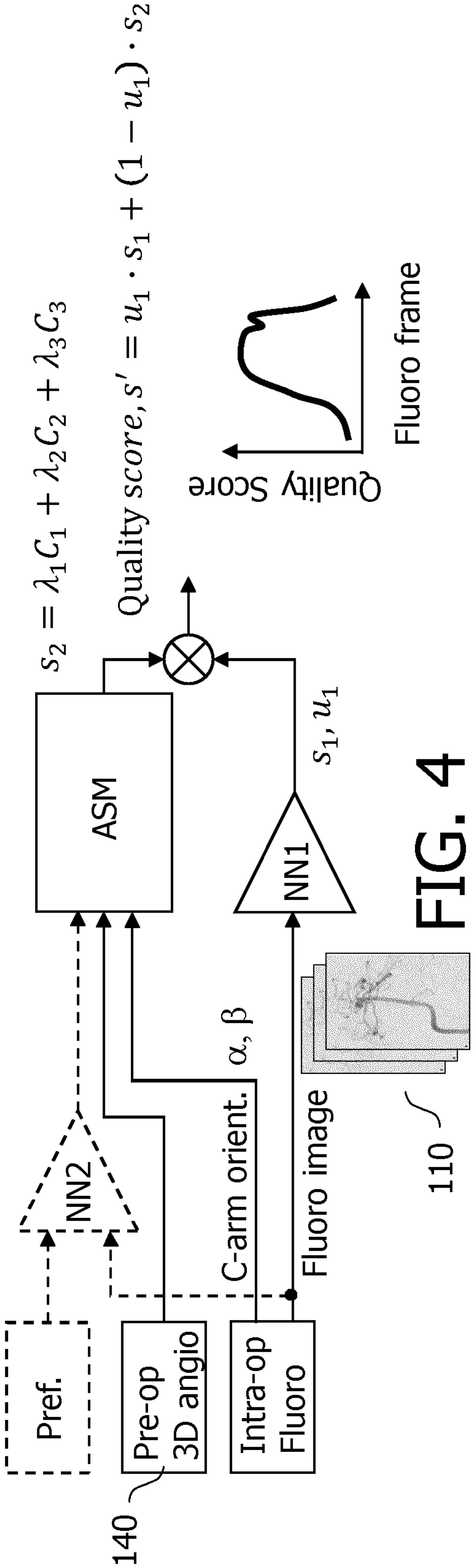
FIG. 4 is a schematic diagram illustrating an example of a method of determining combined image perspective score values s' for X-ray projection images, in accordance with some aspects of the present disclosure.

With reference to FIG. 4, in this example, the X-ray projection images represent the region of interest from a corresponding perspective a, b of the X-ray imaging system respective the region of interest in the subject, and the method described above with reference to FIG. 1 includes:

receiving a 3D X-ray image 140 representing the region of interest 120; and for each of the received X-ray projection images 110:

registering the region of interest in the 3D X-ray image 140 to the region of interest in the X-ray projection image to provide a perspective a, b of the X-ray imaging system 130 respective the region of interest in the 3D X-ray image 140;

computing an analytical image perspective score value $s_2$ from the 3D X-ray image 140 based on the perspective a, b of the X-ray imaging system 130 respective the region of interest in the 3D X-ray image 140, the analytical image perspective score value $s_2$ being computed from the 3D X-ray image 140 based on one or more of the following metrics $C_{1 \ldots n}$: a degree of overlap between a plurality of features in the region of interest, a foreshortening of one or more features in the region of interest, and a presence of one or more artifacts in the region of interest; and combining the analytical image perspective score value $s_2$ and the predicted image perspective score value $s_1$, to provide a combined image perspective score value s' for the X-ray projection image.

In contrast to the predicted image perspective score value $s_1$, and which provides a subjective assessment of the quality of the perspective of the X-ray projection image, the analytical image perspective score value $s_2$ provides an objective assessment of the quality of the perspective of the X-ray projection image. By providing a combined image perspective score value s' that depends on both the analytical image perspective score value $s_2$, as well as the predicted image perspective score value $s_1$, the combined image perspective score value s' provides an assessment in which a subjective bias of the predicted image perspective score value $s_1$ that is introduced via the training of the neural network NN1, may be compensated-for by the objective analytical image perspective score values $s_2$.

Figure 5A:
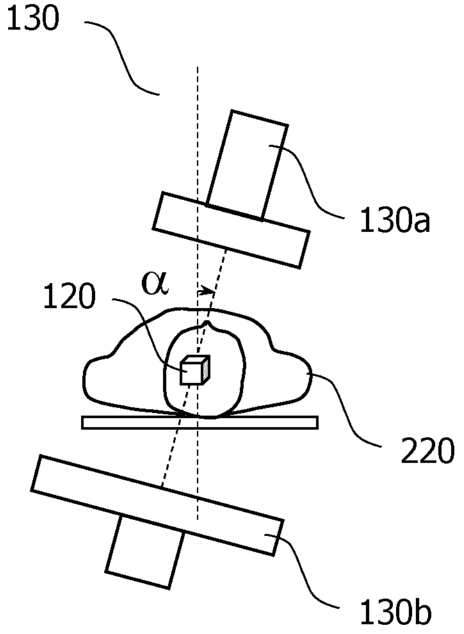
FIG. 5A is a schematic diagram illustrating a perspective of a projection X-ray imaging system 130 respective a region of interest 120 in a subject 220, including a rotational angle a of a central ray of the projection X-ray imaging system 130 around a longitudinal axis of the subject, in accordance with some aspects of the present disclosure
Figure 5B:
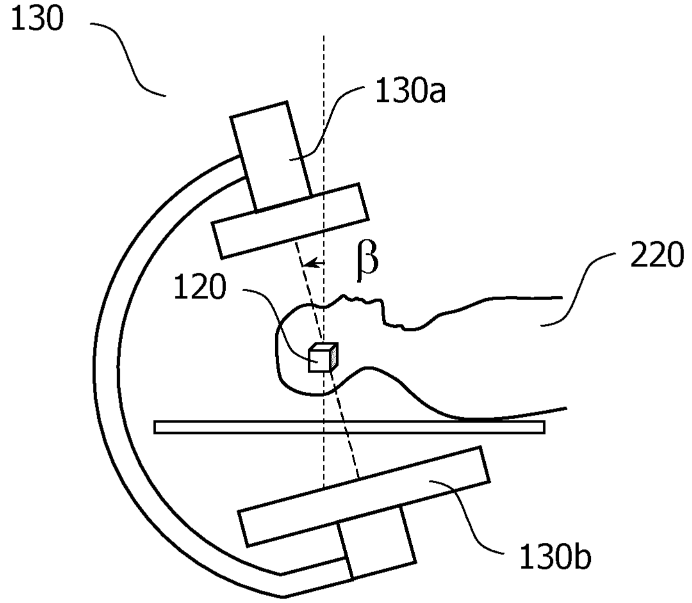
FIG. 5B is a schematic diagram illustrating a perspective of a projection X-ray imaging system 130 respective a region of interest 120 in a subject 220, including a tilt angle b of a central ray of the projection X-ray imaging system 130 with respect to a cranial-caudal axis of the subject 220, in accordance with some aspects of the present disclosure.

In this example, the X-ray projection images represent the region of interest from a corresponding perspective a, b of the X-ray imaging system respective the region of interest in the subject. The perspective may for example be defined by a rotational angle a of a central ray of the X-ray imaging system around a longitudinal axis of the subject, and also by a tilt angle b of a central ray of the X-ray imaging system with respect to a cranial-caudal axis of the subject 220. An example of such a perspective is illustrated in FIG. 5A and FIG. 5B, wherein FIG. 5A is a schematic diagram illustrating a perspective of a projection X-ray imaging system 130 respective a region of interest 120 in a subject 220, including a rotational angle a of a central ray of the projection X-ray imaging system 130 around a longitudinal axis of the subject, in accordance with some aspects of the present disclosure, and FIG. 5B is a schematic diagram illustrating a perspective of a projection X-ray imaging system 130 respective a region of interest 120 in a subject 220, including atilt angle b of a central ray of the projection X-ray imaging system 130 with respect to a cranial-caudal axis of the subject 220, in accordance with some aspects of the present disclosure.

In this example, a 3D X-ray image 140 representing the region of interest 120 is received. The 3D X-ray image may be generated using a volumetric imaging system. As described above for the X-ray projection images, the 3D X-ray image may be a 3D angiographic image. The 3D angiographic image may be generated using a digital subtraction angiography technique, for example.

In this example, the 3D X-ray image may be received by the one or more processors 210 illustrated in FIG. 1. The 3D X-ray image may in general be received from the volumetric X-ray imaging system, or from a computer readable storage medium, or from the Internet or the Cloud, for example. The 3D X-ray image 140 may be received via any form of data communication, as described above for the X-ray projection images 110.

In this example, the region of interest in the 3D X-ray image 140 is registered to the region of interest in each of the X-ray projection images in order to provide a perspective a, b of the X-ray imaging system respective the region of interest in the 3D X-ray image 140. This registration may be performed based on the known perspectives of each of the volumetric imaging system that generates the 3D X-ray image 140, and the projection X-ray imaging system that generates the X-ray projection images 110, respective the subject. Alternatively, this registration may be performed using an image matching technique wherein synthetic projections of the 3D X-ray image 140 at different perspectives of the X-ray imaging system respective the 3D X-ray image, are generated, and compared to the X-ray projection images, until a perspective is found that provides matching images, as is known from the image registration field. In the former case, a perspective of the volumetric imaging system that generates the 3D X-ray image 140, respective the subject, is typically known because when a 3D X-ray image 140 is reconstructed, it is reconstructed with respect to the orientation of the volumetric imaging system. The orientation of the subject with respect to the volumetric imaging system is also known because during generation of the 3D X-ray image the subject lies on a patient bed, and the orientation of the patient bed is known with respect to the volumetric imaging system. In a similar manner, when X-ray projection images are generated, the perspective of the projection X-ray imaging system that generates the X-ray projection images 110, is known respective the subject because the patient also lies on a patient bed, and the perspective of the X-ray imaging system is typically recorded with respect to the patient bed for each X-ray projection image in terms of the perspective parameters a and b described above. Thus, the registration that is performed in this operation may be carried out by matching the orientation of the subject in the 3D X-ray image, to the orientation of the subject in each of the X-ray projection images.

In this example, an analytical image perspective score value $s_2$ is computed for each X-ray projection image, from the 3D X-ray image 140, and based on the perspective a, b of the X-ray imaging system respective the region of interest in the 3D X-ray image 140. The perspective a, b of the X-ray imaging system respective the region of interest in the 3D X-ray image 140 is determined using the registration described above. This is illustrated in FIG. 4 by way of the perspective a, b of the X-ray imaging system for the X-ray projection images, being inputted into an analytical scoring module, ASM. The ASM computes an analytical image perspective score value $s_2$ from the 3D X-ray image 140, by using this inputted perspective, to provide, via the registration, the perspective a, b of the X-ray imaging system respective the region of interest in the 3D X-ray image 140.

The functionality of the ASM may be provided by one or more processors, such as the processors 210 illustrated in FIG. 2.

The analytical image perspective score value $s_2$ is computed from the 3D X-ray image based on the values of one or more of the following metrics $C_{1 \ldots n}$: a degree of overlap between a plurality of features in the region of interest, a foreshortening of one or more features in the region of interest, and a presence of one or more artifacts in the region of interest.

A technique for computing such analytical image perspective score values is described in a document by D. L. Wilson, et al., entitled "Determining X-ray projections for coil treatments of intracranial aneurysms" in IEEE Transactions on Medical Imaging, vol. 18, no. 10, pp. 973-980, October 1999, doi: 10.1109/42.811309. In this document, a method is presented for automatically finding the angles that will produce desired X-ray projections. An algorithm is presented for computing factors such as the aforementioned overlaps, and foreshortening. The algorithm uses as inputs i) a discretely defined 3D segmentation of a region of interest and surrounding anatomy, and ii) a model of the geometric and imaging parameters of an X-ray imaging system.

An example of the calculation of an analytical image perspective score value $s_2$ for a 3D X-ray image that includes a region of interest 120 in the form of a brain aneurism, is provided as follows. Firstly, the 3D X-ray image of the aneurism is segmented in order to assign voxels to the aneurism sac, and to a parent vessel feeding the aneurism sac. Simulated 2D projections of the 3D X-ray image are then generated at multiple different perspectives of an X-ray imaging system with respect to the 3D X-ray image. At each perspective, the value of an image perspective metric is calculated. The image perspective metric may for example include an overlap metric that is determined based on a number of aneurism sac voxels that overlap with the parent vessel. A value of the overlap metric may be calculated by projecting virtual rays from the X-ray source of the X-ray imaging system, through the 3D X-ray image and onto the X-ray detector of the X-ray imaging system, and counting the number of aneurism sac voxels that overlap parent vessel voxels. Since it is typically desired to provide non-overlapping views of the aneurism sac, and the parent vessel, an overlap criterion can be to minimize the value of the overlap metric.

Similarly, a foreshortening metric may be calculated for a portion of a vessel by projecting virtual rays from the X-ray source of the X-ray imaging system, through the 3D X-ray image and onto the X-ray detector, and calculating value of the average projected intensity of the portion of the vessel on the X-ray detector. When an axis of the vessel is parallel to the X-ray detector plane, the value of the foreshortening metric is lowest because the apparent cross sectional area of the vessel on the X-ray detector is highest. As the axis of the vessel is tilted away from the X-ray detector plane, the value of the foreshortening metric increases due to the reduction in apparent cross sectional area of the vessel on the X-ray detector and due to the increase in integrated amount of contrast agent along the path of the virtual X-rays, until an axis of the portion of the vessel is aligned with the paths of the virtual rays, and at which perspective the value of the foreshortening metric is highest. Since it is typically desired to view the parent vessel such that it is parallel to the detector plane, i.e. to minimize foreshortening, a foreshortening criterion can be to minimize the value of the foreshortening metric for the parent vessel of the aneurism.

Similarly, a presence of one or more artifacts in the region of interest may be detected and a value of an artifact metric may be calculated. By way of an example, the artifact metric may represent an overlap between the region of interest and a confounding feature in the projection image. In the example of the region of interest being an aneurism, confounding features that may also be present in the X-ray projection image include skull shadow, and metal artifacts, for instance, from dental implants or fillings. Since it is typically desired to optimize the clarity of a region of interest, an artifact criterion can be to minimize the value of the artifact metric.

The overlap metric, the foreshortening metric, the artifact metric, and other metrics, provide objective assessments of the quality of the perspective of the X-ray projection image, and may be used individually, or in combination, to provide the analytical image perspective score value $s_2$. If multiple metrics $C_{1 \ldots n}$ are used to compute the analytical image perspective score value $s_2$, the metrics may include corresponding weights $l_{1 \ldots n}$ defining an importance of the metrics on the analytical image perspective score value $s_2$.

For example, if the region of interest is a side wall aneurysm, and assuming for the sake of simplicity that the analytical image perspective score value $s_2$ is based on only two metrics, $C_1$ and $C_2$, the metrics may include an overlap of the aneurism sac and the parent vessel, $C_1$, and foreshortening of the parent vessel, $C_2$, The analytical image perspective score value $s_2$ may be determined from the metrics $C_1$ and $C_2$ using the equation:

$$s_2 = \lambda_1 C_1 + \lambda_2 C_2 \qquad \text{Equation 1}$$

and wherein $C_1$ and $C_2$ represent overlap and foreshortening metrics. The metrics may be calculated by the Analytical Scoring Module, ASM, illustrated in FIG. 4, using this equation. In this example, the weight $l_1$ might be chosen as being greater than $l_2$ because significant overlap is expected to be more detrimental to the quality of the perspective than foreshortening.

The overlap criterion, the foreshortening criterion, the artifact criterion, and other criteria, may also be used individually, or in combination, to calculate an optimized analytical image perspective score value $s_2$ in order to provide an optimal view of the region of interest. For example, in Equation 1 it may be desirable to minimize the metric $C_1$; this being to provide optimal detection of coil migration into the parent vessel, and also to minimize the metric $C_2$; this being to provide an optimal view of coil insertion from the connecting artery into the aneurism sac.

In this example, the analytical image perspective score value $s_2$, and the predicted image perspective score value $s_1$ that is generated by the neural network NN1, are combined in order to provide a combined image perspective score value s' for the X-ray projection image. In so doing, a subjective bias of the predicted image perspective score value $s_1$ that is introduced via the training of the neural network NN1, may be compensated-for by the objective analytical image perspective score values $s_2$.

The analytical image perspective score value $s_2$, and the predicted image perspective score value $s_1$, may be combined in various ways. For example, the image perspective score values $s_1$ and $s_2$ may be weighted. The image perspective score values may be weighted with weightings that depend on the X-ray projection images, or the weightings may be fixed. The weightings may for example be fixed such that the combined image perspective score value s' is an average of the image perspective score values $s_1$ and $s_2$.

In one example, the confidence values $u_1$ of the predicted image perspective score values $s_1$ are used to weight both the predicted image perspective score values $s_1$ and the analytical image perspective score value $s_2$. In this example, the combined image perspective score value s' may be calculated using the equation:

$$s' = u_1 \cdot s_1 + (1 - u_1) \cdot s_2 \qquad \text{Equation 2}$$

and wherein $u_1$ lies in the range from 0 to 1. Thus, if the confidence values $u_1$ of the predicted image perspective score values $s_1$ are high, these may be used to place a higher weighting on the predicted image perspective score values $s_1$ than on the analytical image perspective score value $s_2$.

By way of some examples, in one situation, an X-ray projection image 110 may have a very similar appearance or features to the training data that is used to train the neural network NN1. In this situation, the neural network NN1 would be expected to predict an image perspective score value $s_1$ for the X-ray projection image 110 with a high confidence value, $u_1$, e.g. $u_1$=0.9, indicating that it can be relied-upon. In this situation, the combined image perspective score value is calculated as $s'=0.9 \cdot s_1+0.1 \cdot s_2$ In another situation, an X-ray projection image 110 may have fewer features in common with the training data that is used to train the neural network NN1. In this situation, the confidence value of neural network NN1 might be e.g. $u_1$=0.1, and thus the combined image perspective score value would be calculated as $s'=0.1 \cdot s_1+0.9 \cdot s_2$. In another situation, an X-ray projection image 110 may have some similarity to the training data that is used to train the neural network NN1. In this situation, the confidence value of neural network NN1 might be e.g. $u_1$=0.5, and the combined image perspective score value would be calculated as $s'=0.5 \cdot s_1+0.5 \cdot s_2$, i.e. as an average of the predicted image perspective score value $s_1$ and the analytical image perspective score value $s_2$. Using the confidence values $u_1$ of the predicted image perspective score values $s_1$ to weight both the predicted image perspective score value $s_1$ and the analytical image perspective score value $s_2$ in this manner avoids over-reliance on an unreliable image perspective score value $s_1$.

In one example, the predicted image perspective score values $s_1$ may be omitted from the calculation of the combined image perspective score value s'. For example, if the confidence values of the predicted image perspective score values $s_1$ fail to exceed a predetermined threshold value, the predicted image perspective score values $s_1$ may be omitted from the calculation of the combined image perspective score value. This may be achieved by setting the value of $s_1$ to zero in Equation 2, for example. In so doing, over-reliance on an unreliable predicted image perspective score value $s_1$, is also avoided.

As mentioned above, the analytical image perspective score value $s_2$ may be computed based on multiple metrics $C_{1 \ldots n}$. For example, the analytical image perspective score value $s_2$ may be calculated based on an overlap metric, a foreshortening metric, and also based on other metrics. In such cases, the metrics may include corresponding weights $l_{1 \ldots n}$ defining an importance of the metrics on the analytical image perspective score value $s_2$. The use of various techniques is contemplated for setting the values of these weights $l_{1 \ldots n}$. The values of the weights $l_{1 \ldots n}$ may for example be set based on user input, or based on reference values obtained from a lookup table. However, the task of setting the values of the weights $l_{1 \ldots n}$ in is not trivial. This is because, in practical situations their values may depend on factors such as a clinical procedure, the specific region of interest in the X-ray images, e.g. a type of the aneurysm, as well as subjective factors such as a user's preference. Thus it would be advantageous to set the values of the weights $l_{1 \ldots n}$ for individual X-ray projection images in an efficient and reliable manner.

In one example, the values of the weights $l_{1 \ldots n}$ are set for each X-ray projection image using a neural network. In this example, the analytical image perspective score value $s_2$ is computed based on a plurality of metrics, and the metrics include corresponding weights $l_{1 \ldots n}$ defining an importance of the metrics on the analytical image perspective score value $s_2$; and the method described with reference to FIG. 1 includes:

- inputting the X-ray projection image into a second neural network NN2; and
- in response to the inputting, generating predicted values of the weights $l_{1 \ldots n}$, for the X-ray projection image; and
- setting the values of the weights $l_{1 \ldots n}$ used to compute the analytical image perspective score value $s_2$ based on the predicted values of the weights $l_{1 \ldots n}$; and
- wherein the second neural network NN2 is trained to generate the predicted values of the weights $l_{1 \ldots n}$ for the X-ray projection images.

Setting the values of the weights $l_{1 \ldots n}$ in this manner may be considered to efficiently provide reliable analytical image perspective score values, $s_2$. Moreover, it overcomes the burden of manually setting the weights for individual images, as well as the limitations arising from setting the weights to fixed values.

This example operates in the same manner as described above in relation to FIG. 4, and further includes the additional operations of inputting each X-ray projection image 110 into the second neural network NN2, and using the output of the second neural network NN2 to set the values of the weights $l_{1 \ldots n}$. By using a neural network to set these weights, reliable values of the analytical image perspective score values $s_2$, may be obtained. The training of the second neural network NN2 is described in detail below.

In one example, the second neural network NN2 may include an additional input for receiving input data representing a physician's preference of one or more of the multiple metrics $C_{1 \ldots n}$ that are used to calculate the analytical image perspective score values $s_2$. This is illustrated in FIG. 4 by the input to the second neural network NN2 labelled "Pref". The user input may indicate a relative importance of each of the metrics $C_{1 \ldots n}$. A physician may for example favor an overlap metric over a foreshortening metric. The user input may be used to bias the outputs of the second neural network NN2 towards a user's preferred metric. The user input may be received from a user input device such as a keyboard, a mouse, a touchscreen, and so forth. This may be used to tailor the combined image perspective score value s' to reflect a user's preferences for particular views.

In another example, a user's preference may be incorporated into the combined image perspective score value s' by performing inference with a second neural network NN2 that is selected based on a type of training data used to train the second neural network NN2. In this example, the values of the weights $l_{1 \ldots n}$ used to compute the analytical image perspective score value $s_2$, are set based on the predicted values of the weights $l_{1 \ldots n}$; and the method described with reference to FIG. 1 includes:

selecting the second neural network NN2 from a database of neural networks classified based on a type of training data used to train the second neural network NN2; and wherein the types of training data include: training data for a specific interventional procedure, training data for a specific physician.

In so doing, the combined image perspective score value s' that are generated may be tailored to reflect a user's preferences for particular views of a region of interest.

In the case that the same training data is used to train neural network NN1 and neural network NN2, the confidence values $u_1$ that are generated by the neural network NN1 may also be used to decide whether to use the second neural network NN2 to generate the values of the weights $l_{1 \ldots n}$ for the metrics $C_{1 \ldots n}$, or to instead use values for these weights $l_{1 \ldots n}$ from a lookup table. In situations where the neural network NN1 is presented with an image that is different from its training data, the confidence $u_1$ of the neural network NN1 is expected to be low, and it may be decided to use lookup table values to provide the values of the weights rather than to use NN2 to do this. If the neural network NN1 is presented with an image that is different from its training data, it is likely that this will also yield an unreliable output from the second neural network NN2 as well, and so it may be better to rely on the lookup table values for the weights, rather than the potentially unreliable values provided by the second neural network NN2.

Thus, in one example, the method described with reference to FIG. 1 may include triggering either i) the setting of the values of the weights $l_{1 \ldots n}$ used to compute the analytical image perspective score value $s_2$ based on reference values obtained from a lookup table, or ii) the setting the values of the weights $l_{1 \ldots n}$ used to compute the analytical image perspective score value $s_2$ based on the predicted values of the weights $l_{1 \ldots n}$, based on the confidence values $u_1$ of the predicted image perspective score values $s_1$ in relation to a predetermined threshold value.

In one example, the second neural network NN2 may also generate confidence values for its predicted values of the weights $l_{1 \ldots n}$. In one example, the confidence values $u_2$ of the predicted values of the weights $l_{1 \ldots n}$ are used to weight both the analytical image perspective score values $s_2$ and the predicted image perspective score values $s_1$. In another example, the analytical image perspective score value $s_2$ are omitted from the provision of the combined image perspective score value if the confidence values $u_2$ of the predicted values of the weights $l_{1 \ldots n}$ fail to exceed a predetermined threshold. In so doing, it is avoided that an unreliable analytical image perspective score value $s_2$ affects the combined image perspective score value s' that is provided for an image.

In another example, the analytical image perspective score values $s_2$ are set for each X-ray projection image based on values for similar X-ray projection images. This example may be used in the absence of both the second neural network NN2 and the analytical scoring module ASM illustrated in FIG. 4, or in combination with both of these features. In this example, the plurality of X-ray projection images represent the region of interest from a corresponding perspective a, b of the X-ray imaging system respective the region of interest in the subject, and the method described with reference to FIG. 1 includes:

obtaining, from a database, a reference value of an analytical image perspective score $s_2$ for the X-ray projection image, the analytical image perspective score $s_2$ representing one or more of the following metrics $C_{1 \ldots n}$: a degree of overlap between a plurality of features in the region of interest, a foreshortening of one or more features in the region of interest, and a presence of one or more artifacts in the region of interest; and outputting the reference analytical image perspective score value $s_2$ for the X-ray projection image; and wherein the reference value of the analytical image perspective score $s_2$ is obtained from the database by:

comparing the X-ray projection image with a database of reference X-ray projection images and corresponding reference analytical image perspective score values $s_2$; and selecting the reference analytical image perspective score value $s_2$ from the database based on a computed value of a similarity metric representing a similarity between the X-ray projection image and the reference X-ray projection images in the database.

In this example, the reference analytical image perspective score values $s_2$ that are stored in the database may be set by experts. The reference analytical image perspective score values $s_2$ are thus, to some extent, tailored to the images.

When used in combination with the neural network NN2 and the analytical scoring module ASM, the reference analytical image perspective score values $s_2$ may be selectively provided contingent on the confidence values $u_2$ of the predicted values of the weights $l_{1 \ldots n}$. For example, if the confidence values $u_2$ of the predicted values of the weights $l_{1 \ldots n}$ fail to exceed a predetermined threshold, the reference analytical image perspective score values $s_2$ may be provided instead. In this way, it is avoided that unreliable weighting values generated by the second neural network NN2, are used to generate the combined image perspective score values s'.

In any of the examples described above, a subsequent perspective of the X-ray imaging system, may also be determined. The subsequent perspective may be outputted in order to inform an operator of the optimal perspective to use to generate further X-ray projection images. In this example, the method described with reference to FIG. 1 includes:

determining a subsequent perspective of the X-ray imaging system for generating X-ray projection images of the region of interest in the subject; and wherein the subsequent perspective is determined based on:

the predicted image perspective score values $s_1$ generated by the neural network NN1 for the X-ray projection images and the corresponding perspectives of the X-ray imaging system respective the region of interest; and/or the combined image perspective score values provided for the received X-ray projection images and the corresponding perspectives of the X-ray imaging system respective the region of interest.

In this example, the X-ray imaging system perspective corresponding to the highest predicted image perspective score values $s_1$, may be determined and used as the subsequent perspective. Alternatively, the X-ray imaging system perspective corresponding to the highest combined image perspective score values s' may be used. This example finds use in determining an optimal viewing angle for imaging a region of interest. The user may for example generate the X-ray projection images 110 from different perspectives of the X-ray imaging system respective the region of interest by stepping the perspective of the X-ray imaging system in angles a and/or b as described above, in order to generate a range of different image perspective score values for the X-ray projection images 110. This procedure may be used to identify a promising perspective for viewing the region of interest. A more optimal position may be determined by iterating on this procedure with different step sizes. In so doing, the method provides an efficient technique for finding an optimal viewing angle with a low X-ray dose.

The training of the neural network NN1, and the second neural network NN2, is now detailed below.

In general, the training of a neural network involves inputting a training dataset into the neural network, and iteratively adjusting the neural network's parameters until the trained neural network provides an accurate output. Training is often performed using a Graphics Processing Unit "GPU" or a dedicated neural processor such as a Neural Processing Unit "NPU" or a Tensor Processing Unit "TPU". Training often employs a centralized approach wherein cloud-based or mainframe-based neural processors are used to train a neural network. Following its training with the training dataset, the trained neural network may be deployed to a device for analyzing new input data during inference. The processing requirements during inference are significantly less than those required during training, allowing the neural network to be deployed to a variety of systems such as laptop computers, tablets, mobile phones and so forth. Inference may for example be performed by a Central Processing Unit "CPU", a GPU, an NPU, a TPU, on a server, or in the cloud.

The process of training the neural networks NN1 and NN2 described above therefore includes adjusting its parameters. The parameters, or more particularly the weights and biases, control the operation of activation functions in the neural network. In supervised learning, the training process automatically adjusts the weights and the biases, such that when presented with the input data, the neural network accurately provides the corresponding expected output data. In order to do this, the value of the loss functions, or errors, are computed based on a difference between predicted output data and the expected output data. The value of the loss function may be computed using functions such as the negative log-likelihood loss, the mean squared error, or the Huber loss, or the cross entropy loss. During training, the value of the loss function is typically minimized, and training is terminated when the value of the loss function satisfies a stopping criterion. Sometimes, training is terminated when the value of the loss function satisfies one or more of multiple criteria.

Various methods are known for solving the loss minimization problem such as gradient descent, Quasi-Newton methods, and so forth. Various algorithms have been developed to implement these methods and their variants including but not limited to Stochastic Gradient Descent "SGD", batch gradient descent, mini-batch gradient descent, Gauss-Newton, Levenberg Marquardt, Momentum, Adam, Nadam, Adagrad, Adadelta, RMSProp, and Adamax "optimizers" These algorithms compute the derivative of the loss function with respect to the model parameters using the chain rule. This process is called backpropagation since derivatives are computed starting at the last layer or output layer, moving toward the first layer or input layer. These derivatives inform the algorithm how the model parameters must be adjusted in order to minimize the error function. That is, adjustments to model parameters are made starting from the output layer and working backwards in the network until the input layer is reached. In a first training iteration, the initial weights and biases are often randomized. The neural network then predicts the output data, which is likewise, random. Backpropagation is then used to adjust the weights and the biases. The training process is performed iteratively by making adjustments to the weights and biases in each iteration. Training is terminated when the error, or difference between the predicted output data and the expected output data, is within an acceptable range for the training data, or for some validation data. Subsequently the neural network may be deployed, and the trained neural network makes predictions on new input data using the trained values of its parameters. If the training process was successful, the trained neural network accurately predicts the expected output data from the new input data.

In one example, the second neural network NN2 is trained to generate the predicted values of the weights $l_{1 \ldots n}$ for the X-ray projection images by:

- receiving S210 volumetric training data comprising one or more 3D X-ray images 140' representing the region of interest;
- generating S220 virtual projection image training data by projecting the one or more 3D X-ray images 140' onto a virtual detector plane of the X-ray imaging system at a plurality of different perspectives of the X-ray imaging system with respect to each 3D X-ray image 140' to provide a plurality of synthetic projection images;
- computing S230, for each synthetic projection image, an analytical image perspective score value $s_2$ for each corresponding perspective of the X-ray imaging system respective the 3D X-ray image, the analytical image perspective score value $s_2$ being computed from the 3D X-ray image 140' based on one or more of the following metrics $C_{1 \ldots n}$: a degree of overlap between a plurality of features in the region of interest, a foreshortening of one or more features in the region of interest, and a presence of one or more artifacts in the region of interest; and wherein the values of the weights $l_{1 \ldots n}$ used to compute the analytical image perspective score value $s_2$ are set to initial values;
- selecting S240 a subset 150 of the synthetic projection images having analytical image perspective score values $s_2$ meeting a predetermined selection criterion for use in training the second neural network NN2;
- receiving S250 ground truth image perspective score values for the selected subset 150 of the synthetic projection images;
- inputting S260 the subset 150 of the synthetic projection images into the second neural network NN2 to generate updated values of the weights $l_{1 \ldots n}$ for each synthetic projection image, and adjusting S270 parameters of the second neural network NN2 until a difference between the analytical image perspective score values $s_2$ computed for the synthetic projection images with the updated values of the weights $l_{1 \ldots n}$, and the corresponding ground truth image perspective score values, meet a stopping criterion.

This training method is described with reference to FIG. 6, which is a flowchart illustrating an example of a method of training a second neural network NN2 to determine analytical image perspective score values for X-ray projection images, in accordance with some aspects of the present disclosure. This training method is also described with reference to FIG. 7, which is a schematic diagram illustrating an example of a method of training a second neural network NN2 to predict the values of weights $l_{1 \ldots n}$ of metrics $C_{1 \ldots n}$ used in calculating analytical image perspective score values $s_2$ for X-ray projection images, in accordance with some aspects of the present disclosure.

Figure 6:
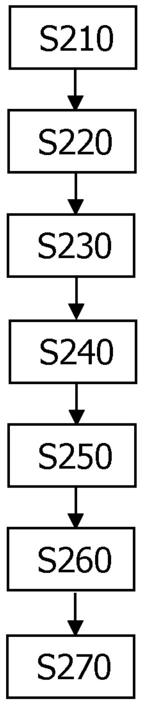
FIG. 6 is a flowchart illustrating an example of a method of training a second neural network NN2 to determine analytical image perspective score values for X-ray projection images, in accordance with some aspects of the present disclosure.
Figure 7:
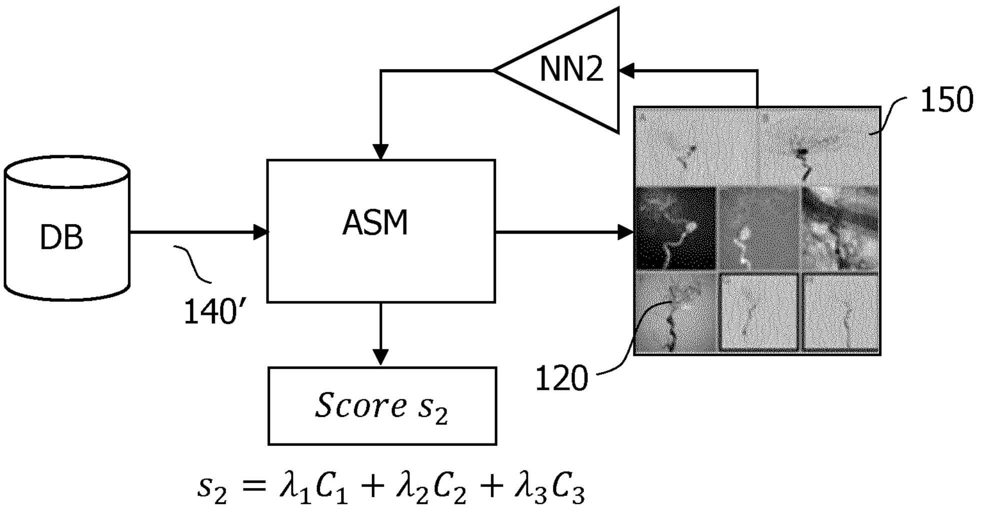
FIG. 7 is a schematic diagram illustrating an example of a method of training a second neural network NN2 to predict the values of weights $l_{1 \ldots n}$ of metrics $C_{1 \ldots n}$ used in calculating analytical image perspective score values $s_2$ for X-ray projection images, in accordance with some aspects of the present disclosure.

With reference to FIG. 6 and FIG. 7, in the operation S210, volumetric training data is received. The volumetric training data includes one or more 3D X-ray images 140' representing the region of interest, as illustrated in FIG. 7. The volumetric training data may in general be received from a computer readable storage medium, such as database DB, illustrated in FIG. 7, or from the Internet, the Cloud, and so forth. The 3D X-ray images may in general be generated for the region of interest from multiple subjects. The 3D X-ray images may be generated from subjects having different ages, different genders, different body mass index values, and so forth.

In the operation S220, virtual projection image training data is generated. This is generated by projecting the one or more 3D X-ray images 140' onto a virtual detector plane of the X-ray imaging system at a plurality of different perspectives of the X-ray imaging system with respect to each 3D X-ray image 140' to provide a plurality of synthetic projection images. The perspectives may be selected at random, and cover a wide range of all possible perspectives of the X-ray imaging system. Generating synthetic projection images, and using these to train the second neural network, addresses the challenge of obtaining a variety of X-ray projection images for a region of interest from different perspectives in order to train the second neural network NN2.

In the operation S230 an analytical image perspective score value $s_2$ is calculated for each synthetic projection image for the corresponding perspective of the X-ray imaging system respective the 3D X-ray image. The analytical image perspective score value $s_2$ is calculated from the 3D X-ray image using the corresponding perspective, and may be calculated using the technique described above. The analytical image perspective score value $s_2$ may therefore be based on one or more of the following metrics $C_{1 \ldots n}$: a degree of overlap between a plurality of features in the region of interest, a foreshortening of one or more features in the region of interest, and a presence of one or more artifacts in the region of interest. In an initial iteration, the values of the weights $l_{1 \ldots n}$ used to compute the analytical image perspective score value $s_2$ are set to initial values. For example, assuming there are n weights, i.e. $l_1$ to $l_n$, the initial values may each be set to 1/n.

In the operation S240, a subset 150 of the synthetic projection images having analytical image perspective score values $s_2$ meeting a predetermined selection criterion, are selected for use in training the second neural network NN2. The selection criterion may for example be that the analytical image perspective score values $s_2$ exceed a predetermined threshold. In so doing, only the best views are selected for use in training the second neural network NN2. Reducing the amount of training data in this manner improves the efficiency of training the second neural network NN2 to predict the analytical image perspective score values $s_2$ with high confidence. It also increases the feasibility of accurately labelling the training data without prohibitively increasing the workload for experts who can provide ground truth subjective scoring.

Alternative selection criteria may also be used for the synthetic projection images. For example, the selection criteria may be set so as to include some synthetic projection images that have high analytical image perspective score values $s_2$, as well as some synthetic projection images that have low analytical image perspective score values $s_2$. Such a selection allows the second neural network NN2 to generate low analytical image perspective score values $s_2$ with high confidence, as well as high analytical image perspective score values $s_2$ with high confidence, which is useful in identifying when the predicted the analytical image perspective score values $s_2$ should, and should not, be used to calculate the combined image perspective score values s'.

In the operation S250, ground truth image perspective score values are received for the selected subset 150 of the synthetic projection images. The ground truth image perspective score values $s_2$ may be provided by an expert.

In the operation S260, the subset 150 of the synthetic projection images is inputted into the second neural network NN2, and the neural network NN2 generates updated values of the weights $l_{1 \ldots n}$ for each synthetic projection image. The parameters of the second neural network NN2 are then adjusted in the operation S270 until a difference between the analytical image perspective score values $s_2$ computed for the synthetic projection images with the updated values of the weights $l_{1 \ldots n}$, and the corresponding ground truth image perspective score values, meet a stopping criterion. The operations S260 and S270 may be performed iteratively.

In so doing, the second neural network NN2 is trained to set the values of the weights $l_{1 \ldots n}$ in order to obtain the objective analytical image perspective score values $s_2$ provided by the expert. Training the second neural network NN2 in this manner, in particular by using the synthetic projection images, overcomes the challenge of obtaining real projection images from multiple perspectives, in order to train the second neural network NN2.

Figure 8:
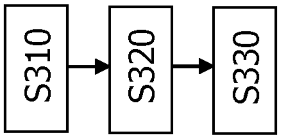
FIG. 8 is a flowchart illustrating a first example of a method of training a neural network NN1 to determine image perspective score values for X-ray projection images, in accordance with some aspects of the present disclosure.
Figure 9:
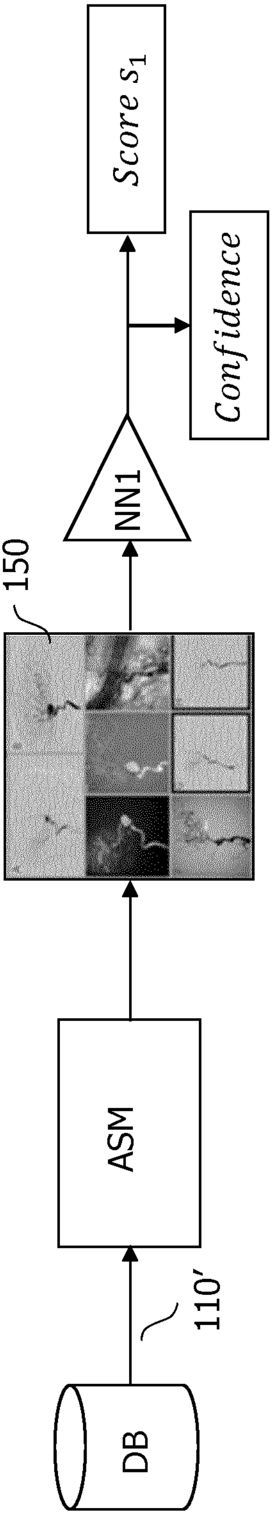
FIG. 9 is a schematic diagram illustrating a first example of a method of training a neural network NN1 to determine image perspective score values for X-ray projection images, in accordance with some aspects of the present disclosure.

An example of training the neural network NN1 described above with reference to FIG. 3 and FIG. 4, is now provided. This example is described with reference to FIG. 8 and FIG. 9. FIG. 8 is a flowchart illustrating a first example of a method of training a neural network NN1 to determine image perspective score values for X-ray projection images, in accordance with some aspects of the present disclosure. FIG. 9 is a schematic diagram illustrating a first example of a method of training a neural network NN1 to determine image perspective score values for X-ray projection images, in accordance with some aspects of the present disclosure.

In this example, the neural network NN1 is trained to generate the predicted image perspective score values $s_1$ for the X-ray projection images by:

- receiving S310 X-ray projection image training data comprising a plurality of training projection images 110' representing the region of interest from different perspectives of an X-ray imaging system respective the region of interest, the training projection images comprising corresponding ground truth image perspective score values;
- inputting S320 the training projection images, and the corresponding ground truth image perspective score values, into the neural network NN1, and adjusting S330 parameters of the neural network NN1 until a difference between the image perspective score values $s_1$ predicted by the neural network NN1, and the corresponding inputted ground truth image perspective score values, meet a stopping criterion. The operations S320 and S330 may be performed iteratively.

In the operation S310, X-ray projection image training data is received. The X-ray projection image training data may be received as described above in relation to the training data for the second neural network. The X-ray projection image training data may be received from a database DB, as illustrated in FIG. 9. The X-ray projection image training data include training projection images 110' representing the region of interest from different perspectives of an X-ray imaging system respective the region of interest. The X-ray projection image training data may be generated using a projection imaging system such as the projection X-ray imaging system 130, to generate images of a region of interest from multiple different perspectives a, b of the projection X-ray imaging system 130 with respect to a region of interest. Corresponding ground truth image perspective score values may be generated for the images by presenting the images to an expert and receiving the assessment of the expert.

As illustrated in FIG. 9, an additional step of calculating analytical image perspective score values $s_2$, may be included, prior to presenting the images to an expert. This additional step may be used to provide a subset 150 of the training projection images for presentation to the expert. The subset 150 may represent training projection images with analytical image perspective score values that meet one or more predetermined conditions. This additional step may be used to include in the training data only images that have high analytical image perspective score values $s_2$, for example. Thus, the subset 150 may represent training projection images having ground truth image perspective score values that exceed a first threshold value. Alternatively, the subset 150 may include images that have high analytical image perspective score values $s_2$, as well as images that have low analytical image perspective score values $s_2$. Thus, the training projection images may include at least some projection images having ground truth image perspective score values that exceed a first threshold value, and at least some ground truth image perspective score values that are below a second threshold value.

In the operations S320, the training projection images, and the corresponding ground truth image perspective score values, are inputted into the neural network NN1. In the operation S330, its parameters are adjusted until a difference between the image perspective score values $s_1$ predicted by the neural network NN1, and the corresponding inputted ground truth image perspective score values, meet a stopping criterion. The adjustment of the parameters may be performed by calculating the value of an error function that represents this difference, and using this to perform backpropagation in the neural network NN1.

In so doing, the neural network NN1 is trained to emulate the image perspective score values provided by the expert. The expert's bias is thus built-in to the image perspective score values predicted by the trained neural network NN1.

Figure 10:
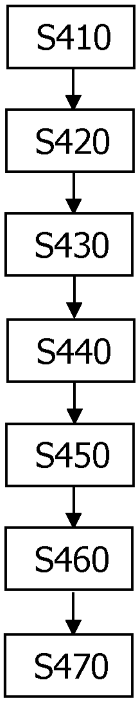
FIG. 10 is a flowchart illustrating a second example of a method of training a neural network NN1 to determine image perspective score values for X-ray projection images, in accordance with some aspects of the present disclosure.
Figure 11:
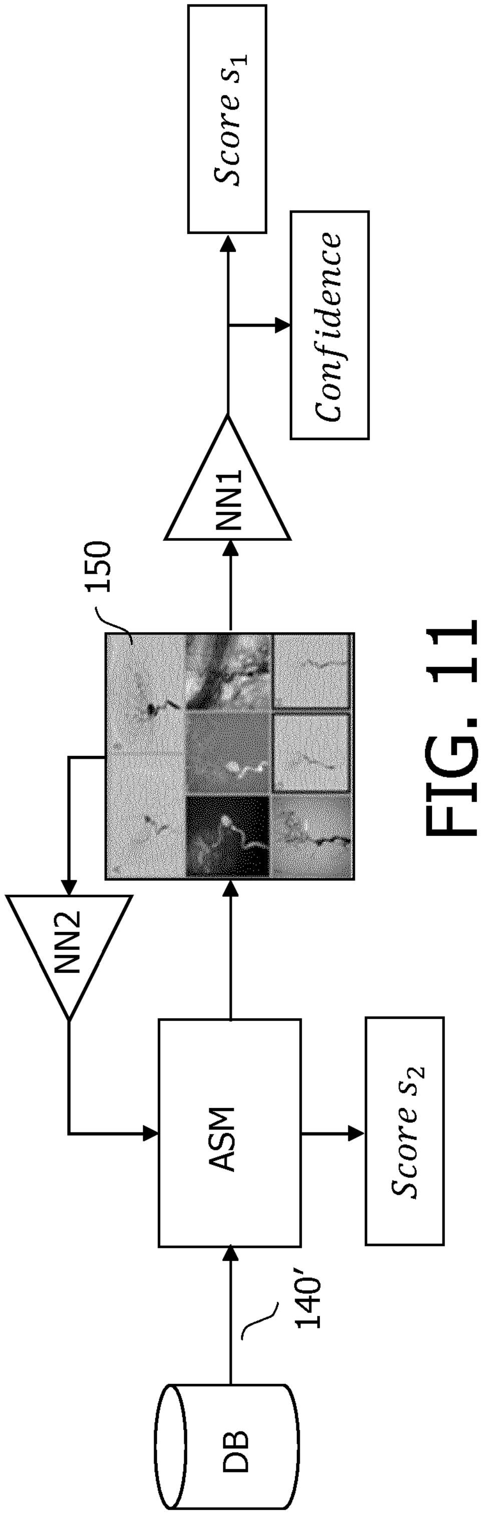
FIG. 11 is a schematic diagram illustrating a second example of a method of training a neural network NN1 to determine image perspective score values for X-ray projection images, in accordance with some aspects of the present disclosure.

A potential limitation of the method described with reference to FIG. 8, is its reliance on the availability of training datasets with images of the region of interest from multiple different perspectives. In practice, the acquisition of such training datasets is complex and time-consuming. In a further example, a method of training the neural network NN1 is provided, and in which synthetic projection images are generated from a 3D X-ray image. This example addresses the challenge associated with obtaining the desired training data. This example is described with reference to FIG. 10 and FIG. 11. FIG. 10 is a flowchart illustrating a second example of a method of training a neural network NN1 to determine image perspective score values for X-ray projection images, in accordance with some aspects of the present disclosure. FIG. 11 is a schematic diagram illustrating a second example of a method of training a neural network NN1 to determine image perspective score values for X-ray projection images, in accordance with some aspects of the present disclosure.

In this example, the neural network NN1 is trained to generate the predicted image perspective score values $s_1$ for the X-ray projection images by:

receiving S410 volumetric training data comprising one or more 3D X-ray images representing the region of interest;

generating S420 virtual projection image training data by projecting the one or more 3D X-ray images onto a virtual detector plane of the X-ray imaging system at a plurality of different perspectives of the X-ray imaging system with respect to each 3D X-ray image to provide a plurality of synthetic projection images;

computing S430, for each synthetic projection image, an analytical image perspective score value $s_2$ for each corresponding perspective of the X-ray imaging system respective the 3D X-ray image, the analytical image perspective score value $s_2$ being computed from the 3D X-ray image based on one or more of the following metrics $C_{1 \ldots n}$: a degree of overlap between a plurality of features in the region of interest, a foreshortening of one or more features in the region of interest, and a presence of one or more artifacts in the region of interest;

selecting S440 a subset of the synthetic projection images having analytical image perspective score values $s_2$ meeting a predetermined selection criterion for use in training the neural network NN1;

receiving S450 ground truth image perspective score values for the selected subset of the synthetic projection images; and inputting S460 the subset of the synthetic projection images, and the corresponding ground truth image perspective score values, into the neural network NN1, and adjusting S470 parameters of the neural network NN1 until a difference between the image perspective score values $s_1$ predicted by the neural network NN1, and the corresponding inputted ground truth image perspective score values, meet a stopping criterion.

With reference to FIG. 10 and FIG. 11, in the operation S410, volumetric training data is received. The volumetric training data includes one or more 3D X-ray images 140' representing the region of interest, as illustrated in FIG. 7. The volumetric training data may in general be received from a computer readable storage medium, such as database DB, illustrated in FIG. 11, or from the Internet, the Cloud, and so forth. The 3D X-ray images may in general be generated for the region of interest from different subjects. The X-ray images may be generated from subjects having different ages, different genders, different body mass index values, and so forth.

In the operation S420, virtual projection image training data is generated. The virtual projection image training data includes a plurality of synthetic projection images. The synthetic projection images may be generated from the one or more 3D X-ray images 140' in the manner described for the operation S220 above.

In the operation S430, an analytical image perspective score value $s_2$ is calculated for each synthetic projection image for the corresponding perspective of the X-ray imaging system respective the 3D X-ray image. This operation may be performed in the manner described above for the operation S230.

In the operation S440, a subset 150 of the synthetic projection images is selected. This selection may be performed in the manner described above for the operation S240, with the difference that in the operation S440, the subset is now used to train the neural network NN1. The selection may be performed so as to include at least some projection images having ground truth image perspective score values that exceed a first threshold value. Alternatively, the selection may be performed so as to include at least some projection images having ground truth image perspective score values that exceed a first threshold value, and at least some ground truth image perspective score values that are below a second threshold value.

In the operation S450, ground truth image perspective score values are received for the selected subset of the synthetic projection images. The ground truth image perspective score values may be provided by an expert.

In the operation S460, the subset of the synthetic projection images, and the corresponding ground truth image perspective score values, are inputted into the neural network NN1. In the operation S470, the parameters of the neural network NN1 are adjusted until a difference between the image perspective score values $s_1$ predicted by the neural network NN1, and the corresponding inputted ground truth image perspective score values, meet a stopping criterion. The adjustment of the parameters may be performed by calculating the value of an error function that represents this difference, and using this to perform backpropagation in the neural network NN1. The operations S460 and S470 may be performed iteratively.

In so doing, the neural network NN1 is trained to emulate the subjective image perspective score values provided by the expert. The expert's bias is thus built-in to the image perspective score values predicted by the trained neural network NN1. Moreover, since synthetic projection images are used, this is achieved without the need for an extensive dataset of real projection training images from multiple different perspectives.

In this example, the values of the weights $l_{1 \ldots n}$ that are used to compute the analytical image perspective score value $s_2$, may be generated by the second neural network NN2. Thus, the second neural network NN2 may be trained before the neural network NN1, and then used to train the neural network NN1. Alternatively, a trained neural network NN1 may be re-trained or fine-tuned using the $l_{1 \ldots n}$ weighted analytical image perspective score value $s_2$ generated by the neural network NN2. Alternatively, the values of the weights $l_{1 \ldots n}$ used to compute the analytical image perspective score value $s_2$ may be set to reference values.

In accordance with another example, a computer program product is provided. The computer program product includes instructions which when executed by one or more processors, cause the one or more processors to carry out a method of determining image perspective score values $s_1$ for X-ray projection images 110 representing a region of interest 120 in a subject. The method comprises:

receiving S110 a plurality of X-ray projection images 110, the X-ray projection images representing the region of interest 120 from a plurality of different perspectives of an X-ray imaging system 130 respective the region of interest;

inputting S120 the X-ray projection images into a neural network NN1; and in response to the inputting, generating S130 a predicted image perspective score value $s_1$ for each of the X-ray projection images; and wherein the neural network NN1 is trained to generate the predicted image perspective score values $s_1$ for the X-ray projection images.

In accordance with another example, a system for determining image perspective score values $s_1$ for X-ray projection images 110 representing a region of interest 120 in a subject, is provided. The system 100 comprises one or more processors 210 configured to:

receive S110 a plurality of X-ray projection images 110, the X-ray projection images representing the region of interest 120 from a plurality of different perspectives of an X-ray imaging system 130 respective the region of interest;

input S120 the X-ray projection images into a neural network NN1; and in response to the input, generate S130 a predicted image perspective score value $s_1$ for each of the X-ray projection images; and wherein the neural network NN1 is trained to generate the predicted image perspective score values $s_1$ for the X-ray projection images.

The example system 100 is illustrated in FIG. 1. In some examples, the system 100 may also include one or more of: a projection X-ray imaging system 130 for providing the X-ray projection images 110, a monitor 240 for displaying the X-ray projection images 110 and/or the predicted image perspective score value $s_1$ for each of the X-ray projection images and/or other outputs generated by the system, a patient bed 250, and a user input device configured to receive user input not illustrated in FIG. 1, such as a keyboard, a mouse, a touchscreen, and so forth.

The above examples are to be understood as illustrative of the present disclosure, and not restrictive. Further examples are also contemplated. For instance, the examples described in relation to computer-implemented methods, may also be provided by the computer program product, or by the computer-readable storage medium, or by the system 100, in a corresponding manner. It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A computer-implemented method of determining image perspective score values for a plurality of X-ray projection images representing a plurality of different perspectives of an X-ray imaging system respective to a region of interest in a subject, the method comprising:

receiving a 3D X-ray image representing the region of interest;

receiving the plurality of X-ray projection images representing the plurality of different perspectives of the X-ray imaging system respective to the region of interest;

inputting the X-ray projection images into a trained neural network; and generating from the trained neural network a predicted image perspective score value for each of the X-ray projection images for each of the received X-ray projection images:

registering the region of interest in the 3D X-ray image to the region of interest in the X-ray image to provide a perspective of the X-ray imaging system respective the region of interest in the 3D X-ray image;

computing an analytical image perspective score value from the 3D X-ray image based on corresponding weights defining an importance of the metrics on the analytical image perspective score value and one or more of the following metrics: a degree of overlap between a plurality of features in the region of interest, a foreshortening of one or more features in the region of interest, and a presence of one or more artifacts in the region of interest; and combining the analytical image perspective score value and the predicted image perspective score value, to provide a combined image perspective score value for the X-ray projection image;

the method further comprising at least one of:

setting the values of the weights used to compute the analytical image perspective score value based on user input, or based on reference values obtained from a lookup table, and inputting the X-ray projection image into a second trained neural network;

generating from the second trained neural network predicted values of the weights for the X-ray projection image; and setting the values of the weights used to compute the analytical image perspective score value based on the predicted values of the weights.

2. The computer-implemented method according to claim 1, wherein the neural network is further configured to generate a confidence value for each of the predicted image perspective score values, and wherein the method further comprises outputting the confidence values.

3. The computer-implemented method according to claim 1, wherein the values of the weights used to compute the analytical image perspective score value are set based on the predicted values of the weights; and wherein the method further comprises:

selecting the second neural network from a database of neural networks classified based on a type of training data used to train the second neural network; and wherein the types of training data include: training data for a specific interventional procedure, training data for a specific physician.

4. The computer-implemented method according to claim 1, wherein at least one of the neural network and the second neural network are further configured to generate a confidence value for each of the predicted image perspective score values, and for the predicted values of the weights, respectively, and wherein the method further comprises one or more of:

using the confidence values of the predicted image perspective score values to weight the predicted image perspective score values;

using the confidence values of the predicted image perspective score values to weight both the predicted image perspective score values and the analytical image perspective score value;

omitting the predicted image perspective score values from the provision of the combined image perspective score value if the confidence values of the predicted image perspective score values fail to exceed a predetermined threshold value;

triggering either i) the setting of the values of the weights used to compute the analytical image perspective score value based on reference values obtained from a lookup table, or ii) the setting the values of the weights used to compute the analytical image perspective score value based on the predicted values of the weights, based on the confidence values of the predicted image perspective score values in relation to a predetermined threshold value;

using the confidence values of the predicted values of the weights to weight both the analytical image perspective score value and the analytical image perspective score value; and omitting the analytical image perspective score value from the provision of the combined image perspective score value if the confidence values of the predicted values of the weights fail to exceed a predetermined threshold.

5. The computer-implemented method according to claim 1, wherein the plurality of X-ray projection images represent the region of interest from a corresponding perspective of the X-ray imaging system respective the region of interest in the subject, and wherein the method further comprises:

obtaining, from a database, a reference value of an analytical image perspective score for the X-ray projection image, the analytical image perspective score representing one or more of the following metrics: a degree of overlap between a plurality of features in the region of interest, a foreshortening of one or more features in the region of interest, and a presence of one or more artifacts in the region of interest; and outputting the reference analytical image perspective score value for the X-ray projection image, wherein the reference value of the analytical image perspective score is obtained from the database by:

comparing the X-ray projection image with a database of reference X-ray projection images and corresponding reference analytical image perspective score values; and selecting the reference analytical image perspective score value from the database based on a computed value of a similarity metric representing a similarity between the X-ray projection image and the reference X-ray projection images in the database.

6. The computer-implemented method according to claim 1, further comprising:

determining a subsequent perspective of the X-ray imaging system for generating X-ray projection images of the region of interest in the subject; and wherein the subsequent perspective is determined based on at least one of:

the predicted image perspective score values generated by the neural network for the X-ray projection images and the corresponding perspectives of the X-ray imaging system respective the region of interest; and the combined image perspective score values provided for the received X-ray projection images and the corresponding perspectives of the X-ray imaging system respective the region of interest.

7. The computer-implemented method according to claim 1, wherein the second neural network is trained to generate the predicted values of the weights for the X-ray projection images by:

receiving volumetric training data comprising one or more 3D X-ray images representing the region of interest;

generating virtual projection image training data by projecting the one or more 3D X-ray images onto a virtual detector plane of the X-ray imaging system at a plurality of different perspectives of the X-ray imaging system with respect to each 3D X-ray image to provide a plurality of synthetic projection images;

computing, for each synthetic projection image, an analytical image perspective score value for each corresponding perspective of the X-ray imaging system respective the 3D X-ray image, the analytical image perspective score value being computed from the 3D X-ray image based on one or more of the following metrics: a degree of overlap between a plurality of features in the region of interest, a foreshortening of one or more features in the region of interest, and a presence of one or more artifacts in the region of interest; and wherein the values of the weights used to compute the analytical image perspective score value are set to initial values;

selecting a subset of the synthetic projection images having analytical image perspective score values meeting a predetermined selection criterion for use in training the second neural network;

receiving ground truth image perspective score values for the selected subset of the synthetic projection images; and inputting the subset of the synthetic projection images into the second neural network to generate updated values of the weights for each synthetic projection image, and adjusting parameters of the second neural network until a difference between the analytical image perspective score values computed for the synthetic projection images with the updated values of the weights, and the corresponding ground truth image perspective score values, meet a stopping criterion.

8. The computer-implemented method according to claim 1, wherein the neural network is trained to generate the predicted image perspective score values for the X-ray projection images by:

receiving X-ray projection image training data comprising a plurality of training projection images representing the region of interest from different perspectives of an X-ray imaging system respective the region of interest, the training projection images comprising corresponding ground truth image perspective score values; and inputting the training projection images, and the corresponding ground truth image perspective score values, into the neural network, and adjusting parameters of the neural network until a difference between the image perspective score values predicted by the neural network, and the corresponding inputted ground truth image perspective score values, meet a stopping criterion.

9. The computer-implemented method according to claim 1, wherein the neural network is trained to generate the predicted image perspective score values for the X-ray projection images by:

receiving volumetric training data comprising one or more 3D X-ray images representing the region of interest;

generating virtual projection image training data by projecting the one or more 3D X-ray images onto a virtual detector plane of the X-ray imaging system at a plurality of different perspectives of the X-ray imaging system with respect to each 3D X-ray image to provide a plurality of synthetic projection images;

computing, for each synthetic projection image, an analytical image perspective score value for each corresponding perspective of the X-ray imaging system respective the 3D X-ray image, the analytical image perspective score value being computed from the 3D X-ray image based on one or more of the following metrics: a degree of overlap between a plurality of features in the region of interest, a foreshortening of one or more features in the region of interest, and a presence of one or more artifacts in the region of interest;

selecting a subset of the synthetic projection images having analytical image perspective score values meeting a predetermined selection criterion for use in training the neural network;

receiving ground truth image perspective score values for the selected subset of the synthetic projection images; and inputting the subset of the synthetic projection images, and the corresponding ground truth image perspective score values, into the neural network, and adjusting parameters of the neural network until a difference between the image perspective score values predicted by the neural network, and the corresponding inputted ground truth image perspective score values, meet a stopping criterion.

10. The computer-implemented method according to claim 9, wherein the values of the weights used to compute the analytical image perspective score value are generated by the second neural network.

11. The computer-implemented method according to claim 8, wherein the respective training projection images, or the selected subset of the synthetic projection images, comprise at least some projection images having ground truth image perspective score values that exceed a first threshold value, and at least some ground truth image perspective score values that are below a second threshold value.

12. A non-transitory computer-readable storage medium having stored a computer program comprising instructions which, when executed by one or more processors, cause the one or more processors to:

receive a 3D X-ray image representing the region of interest;

receive a plurality of X-ray projection images representing a plurality of different perspectives of an X-ray imaging system respective to a region of interest;

input the X-ray projection images into a trained neural network; and generate from the trained neural network a predicted image perspective score value for each of the X-ray projection images for each of the received X-ray projection images:

register the region of interest in the 3D X-ray image to the region of interest in the X-ray image to provide a perspective of the X-ray imaging system respective the region of interest in the 3D X-ray image;

compute an analytical image perspective score value from the 3D X-ray image based on corresponding weights defining an importance of the metrics on the analytical image perspective score value and one or more of the following metrics: a degree of overlap between a plurality of features in the region of interest, a foreshortening of one or more features in the region of interest, and a presence of one or more artifacts in the region of interest; and combine the analytical image perspective score value and the predicted image perspective score value, to provide a combined image perspective score value for the X-ray projection image;

the instructions further causing the one or more processors to:

set the values of the weights used to compute the analytical image perspective score value based on user input, or based on reference values obtained from a lookup table, and input the X-ray projection image into a second trained neural network;

generate from the second trained neural network predicted values of the weights for the X-ray projection image; and set the values of the weights used to compute the analytical image perspective score value based on the predicted values of the weights.

13. A system for determining image perspective score values for X-ray projection images representing a region of interest in a subject, the system comprising:

one or more processors configured to:

receive a 3D X-ray image representing the region of interest;

receive a plurality of X-ray projection images representing a plurality of different perspectives of an X-ray imaging system respective to a region of interest;

input the X-ray projection images into a trained neural network; and generate from the trained neural network a predicted image perspective score value for each of the X-ray projection images;

for each of the received X-ray projection images:

register the region of interest in the 3D X-ray image to the region of interest in the X-ray image to provide a perspective of the X-ray imaging system respective the region of interest in the 3D X-ray image;

compute an analytical image perspective score value from the 3D X-ray image based on corresponding weights defining an importance of the metrics on the analytical image perspective score value and one or more of the following metrics: a degree of overlap between a plurality of features in the region of interest, a foreshortening of one or more features in the region of interest, and a presence of one or more artifacts in the region of interest; and combine the analytical image perspective score value and the predicted image perspective score value, to provide a combined image perspective score value for the X-ray projection image;

the one or more processors configured further configured to:

set the values of the weights used to compute the analytical image perspective score value based on user input, or based on reference values obtained from a lookup table, and input the X-ray projection image into a second trained neural network;

generate from the second trained neural network predicted values of the weights for the X-ray projection image; and set the values of the weights used to compute the analytical image perspective score value based on the predicted values of the weights.

14. The non-transitory computer-readable storage medium according to claim 12, wherein the neural network is further configured to generate a confidence value for each of the predicted image perspective score values, and wherein the method further comprises outputting the confidence values.

* * * * *